United States Patent [19]

Jeong

[11] Patent Number: 5,389,979

[45] Date of Patent: Feb. 14, 1995

[54] CHROMINANCE SIGNAL PLAYBACK SYSTEM AND METHOD FOR VIDEO CASSETTE RECORDERS HAVING NOISE SUPPRESSION OF THE CHROMINANCE SIGNAL

[75] Inventor: Dong K. Jeong, Kyungki-do, Rep. of Korea

[73] Assignee: Gold Star Co., Ltd., Seoul, Rep. of Korea

[21] Appl. No.: 882,350

[22] Filed: May 13, 1992

[30] Foreign Application Priority Data

May 13, 1991 [KR] Rep. of Korea .................. 6780/1991

[51] Int. Cl.$^6$ .......................... H04N 9/70; H04N 9/71
[52] U.S. Cl. .................... 348/644; 358/317; 358/315; 348/624
[58] Field of Search ............... 358/328, 314, 340, 336, 358/315, 316, 36, 27, 40, 317, 318, 26, 310; H04N 9/70, 9/71, 9/68; 348/644, 643, 647, 648, 645, 646, 607, 618, 622, 624, 630, 675, 674, 708, 713

[56] References Cited

U.S. PATENT DOCUMENTS

| | | | |
|---|---|---|---|
| 3,947,871 | 3/1976 | Amari et al. ..................... | 358/26 X |
| 4,253,108 | 2/1981 | Engel ................................ | 358/26 |
| 4,357,628 | 11/1982 | Wharton .......................... | 358/317 |
| 4,860,091 | 8/1989 | Kimura et al. ................... | 358/27 X |

FOREIGN PATENT DOCUMENTS

| | | | |
|---|---|---|---|
| 56-076694 | 6/1981 | Japan ................................ | 358/26 |
| 58-147291 | 9/1983 | Japan ................................ | 358/316 |

*Primary Examiner*—Victor R. Kostak
*Assistant Examiner*—Safet Metjahic
*Attorney, Agent, or Firm*—Fish & Richardson

[57] ABSTRACT

An improved chrominance signal playback system and method for a video cassette recorder are disclosed. A radio frequency of composite video signal detected by a video head is applied to a low-pass filter which filters the composite video signal and outputs a low frequency of chrominance signal. The chrominance signal from the low-pass filter is automatically gain-controlled and is demodulated. The demodulated chrominance signal is applied to a color killer circuit. Also, an envelope detector detects an envelope signal from the chrominance signal from the low-pass filter. In response to the envelope signal, an attenuator attenuates the level of the chrominance signal from the color killer circuit. This results in the suppression of white noise in the chrominance signal. Therefore, the signal-to-noise ratio and the accompanying image quality can be enhanced.

20 Claims, 3 Drawing Sheets

CHROMINANCE SIGNAL PLAYBACK SYSTEM AND METHOD FOR VIDEO CASSETTE RECORDERS HAVING NOISE SUPPRESSION OF THE CHROMINANCE SIGNAL

BACKGROUND OF THE INVENTION

1. Field of the Invention

The present invention relates in general to a video cassette recorder, and more particularly to a chrominance signal playback system and method, which reduce the generation of noise on the screen while the video cassette recorder is in the playback mode.

2. Description of the Prior Art

Referring to FIG. 5, there is shown, in block form, an example of a conventional video signal playback system for a video cassette recorder, referred to hereinafter as a VCR, which includes luminance signal and chrominance signal processing circuits. In this figure, composite video signals are detected by video heads 51 and 52 which then apply the detected video signals to an amplifier 53 which amplifies the video signals by predetermined degrees of amplification. The amplified video signals from the amplifier 53 are applied to luminance signal and chrominance signal processing circuits 54 and 55 which processes the video signals, respectively, in such manners as to obtain luminance and chrominance signals from the video signals. These processes are well-known in the VCR art. Therefore, these processes will hereinafter be described in brief.

The luminance signal processing circuit 54 comprises a high-pass filter 56 which high-pass filters the video signal from the amplifier 53 to separate a luminance signal from the video signal on the basis of frequency band. The resulting luminance signal is demodulated into an original luminance signal by a demodulator 57 which then applies the demodulated luminance signal to a low-pass filter 58. In result, the low-pass filtered output from the low-pass filter 58 is a desired luminance signal. This luminance signal is then applied to a mixer 59. The output from the low-pass filter 58 is also applied to a synchronous signal separator 60 wherein synchronous pulse signals at horizontal and vertical frequencies are separated and applied to the chrominance signal processing circuit 55.

The chrominance signal processing circuit 55 comprises a low-pass filter 61 which low-pass filters the video signal from the amplifier 53 to separate a chrominance signal from the video signal on the basis of frequency band. The resulting chrominance signal is applied to an automatic gain controller 62 for automatic control of its gain. The output from the automatic gain controller 62 is demodulated into an original chrominance signal by a demodulator 63 which then applies the demodulated chrominance signal to a color killer circuit 64. The automatic gain controller 62 performs the automatic gain control of the resulting chrominance signal from the low-pass filter 61 according to the feedback chrominance signal through a color burst gate 65 and a gain detector 66. The output from the color killer circuit 64 is applied to a band-pass filter 67. In result, the band-pass filtered output from the band-pass filter 67 is a desired chrominance signal. This chrominance signal is combined with the luminance signal from the luminance signal processing circuit 54, in the mixer 59. Finally, the mixer 59 outputs the resulting composite video signal.

The color killer circuit 64 is a circuit for blocking the chrominance signal output when there is no play-back chrominance signal, or when the play-back chrominance signal is weak, in order to prevent noise generation. In operation, a pulse generator 68 is driven by the synchronous signals from the synchronous signal separator 60, for generating pulses at a predetermined period. In accordance with the pulses from the pulse generator 68, a color burst gate 69 performs a gate operation to extract a color burst signal. The output from the color burst gate 69 is applied to a killing signal detector 70 which controls the color killer circuit 64 according to whether the color burst signal is present or not. That is, if no color burst signal is present or if the color burst signal has a level lower than a given reference value, the killing signal detector 70 controls the color killer circuit 64 to block the input of the play-back chrominance signal to the mixer 59. As a result, under the control of the killing signal detector 70, the color killer circuit 64 blocks the output from the demodulator 63 to the band-pass filter 67. This results in the general absence of the appearance of white noise generated in the chrominance signal processing circuit, in the video output.

The color burst signal is sometimes referred to as a color synchronizing signal. In the VCR, it is necessary to make the local oscillator frequency and phase concurrent with the chrominance subcarrier frequency and phase, so as to extract a red signal-luminance signal (R-Y) and a blue signal-luminance signal (B-Y) from the chrominance carrier. For this reason, in recording the video signal the color synchronizing signal is included. The color synchronizing signal is generally referred to as the color burst signal. The color burst signal is typically inserted in a back porch portion of the horizontal synchronous signal which is present in a horizontal blanking interval of the composite video signal, as shown in FIG. 6.

However, the conventional video signal playback system has the disadvantages described below. Generally, in the luminance signal processing circuit, the conventional system has used a line noise removing circuit utilizing a video signal line correlation and a noise suppressor circuit utilizing a pre-emphasis circuit and a de-emphasis circuit. However, in the chrominance signal processing circuit, such a noise suppressor circuit has not been employed since the frequency band of the chrominance signal to be processed is narrower than that of the luminance signal.

Also, the color killer circuit 64 in the chrominance signal processing circuit 55 in FIG. 5 is desirable in order to block or pass the chrominance signal output in accordance with the presence and level of the color burst signal, but has a disadvantage described below. Namely, the color killer circuit does not perform the killing operation when a monochrome signal is a portion of the composite video signal and the color burst signal is normally present in every field. This results in the intermixture of white noise from the chrominance signal processing circuit into the monochrome signal portion of the composite video signal, resulting in degradation in image quality of the play-back video signal on the screen and degradation in the signal-to-noise ratio thereof. Generally, the case where a portion of the television broadcasting video image on the screen is monochrome is rare. However, since the level of the chrominance signal is feeble or weak on a dark portion of the screen, the level of the white noise becomes relatively higher than that of the chrominance signal on that portion. This means that it is impossible to avoid the above-mentioned problem in the prior art system.

SUMMARY OF THE INVENTION

The present invention has been made to address the above problems. It is an object of the present invention to provide a chrominance signal playback system and method for video cassette recording for removing white noise from a radio frequency of a composite video signal detected by a video head, for improvement in the signal-to-noise ratio and image quality.

In accordance with one aspect of the present invention, there is provided a chrominance signal playback system for a video cassette recorder comprising: first filtering means for separating a chrominance signal from a radio frequency of the composite video signal; automatic gain control means for automatically controlling the gain of the separated chrominance signal from said first filtering means; demodulating means for demodulating the gain-controlled chrominance signal from said automatic gain control means; color killer means for blocking or passing the demodulated chrominance signal output from said demodulating means in accordance with the presence and level of a color burst signal in the demodulated chrominance signal output; noise removing means for detecting an envelope signal from the chrominance signal from said first filtering means and controlling the level of the chrominance signal from said color killer means in accordance with the level of the detected envelope signal, to remove noise from the chrominance signal from said color killer means; and second filtering means for filtering the noise-removed chrominance signal from said noise removing means to pass a desired frequency band of chrominance signal.

In accordance with another aspect of the present invention, there is provided a chrominance signal playback method for a video cassette recorder, comprising the steps of: (a) separating a low frequency of chrominance signal from a radio frequency of the composite video signal detected by a video head; (b) automatically controlling the gain of the separated chrominance signal and demodulating the gain-controlled chrominance signal; (c) blocking or passing the demodulated chrominance signal in accordance with the presence and level of a color burst signal in the demodulated chrominance signal; and (d) detecting an envelope signal from the separated chrominance signal and controlling the level of the passed chrominance signal in accordance with the level of the detected envelope signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
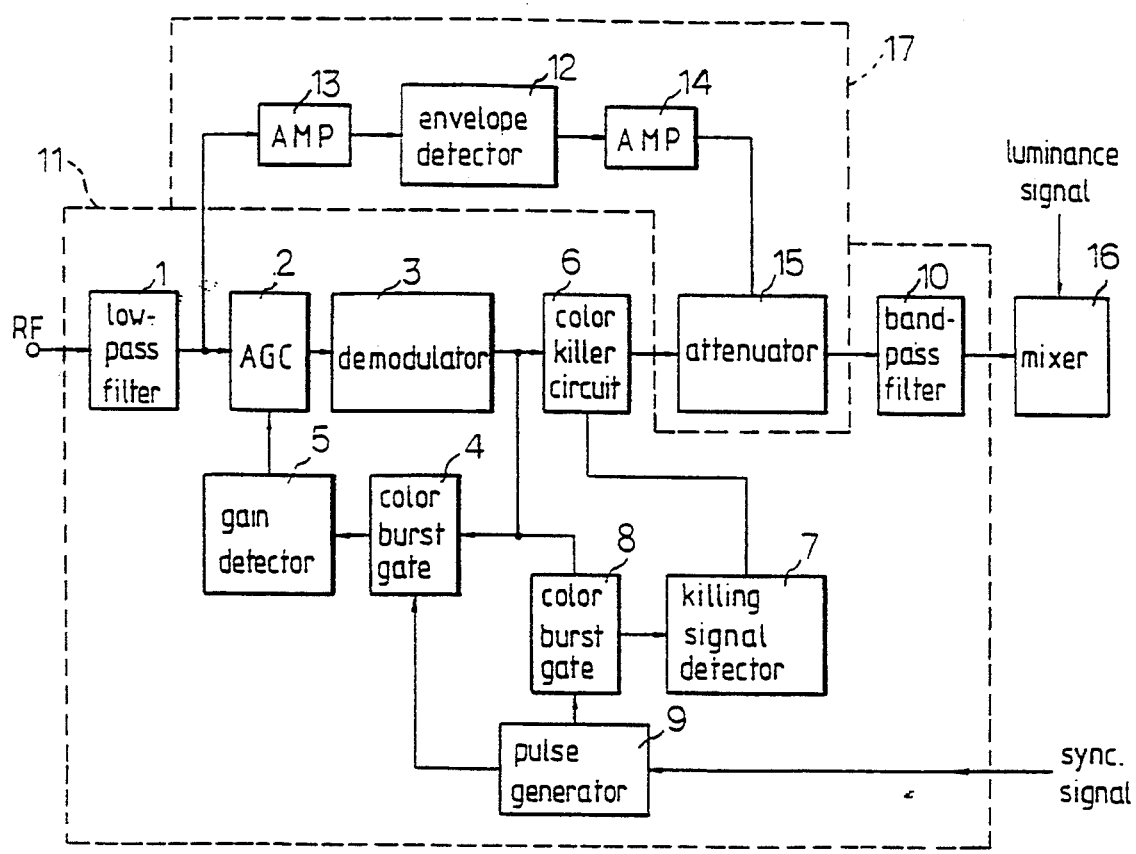
FIG. 1 is a block diagram of a chrominance signal playback system of the present invention.

Referring to FIG. 1, a chrominance signal playback system of the present invention comprises a chrominance signal processing circuit 11 and a noise removing circuit 17. The chrominance signal processing circuit comprises a low-pass filter 1 for low-pass filtering a radio frequency of the composite video signal detected by a video head (not shown), to separate a chrominance signal from the video signal on the basis of the frequency band, an automatic gain controller 2 for automatically controlling the gain of the resulting chrominance signal from the low-pass filter 1, a demodulator 3 for demodulating the output from the automatic gain controller 2 into the original chrominance signal, a color burst gate 4 and a gain detector 5 forming a feedback loop for controlling the gain of the resulting chrominance signal from the low-pass filter 1, a color killer circuit 6 for blocking or passing the chrominance signal output from the demodulator 3 in accordance with the presence and level of a color burst signal in the chrominance signal output, a killing signal detector 7 and a color burst gate 8 for controlling the operation of the color killer circuit 6, a pulse generator 9 for being driven by external synchronous signals to generate pulses at a predetermined period, and a band-pass filter 10 for band-pass filtering the output from the color killer circuit 6 to obtain a desired chrominance signal, and applying the desired chrominance signal to a mixer 16.

The noise removing circuit 17 comprises a first amplifier 13 for amplifying the resulting chrominance signal from the low-pass filter 1 in the chrominance signal processing circuit 11 by a predetermined amplification degree, an envelope detector 12 for detecting an envelope signal from the amplified chrominance signal from the first amplifier 13, the envelope signal being in proportion to the level of the amplified chrominance signal, a second amplifier 14 for amplifying the envelope signal from the envelope detector 12 by a predetermined amplification degree, and an attenuator 15 having a critical value Vc and connected between the color killer circuit 6 and the band-pass filter 10 in the chrominance signal processing circuit 11, for attenuating the level of the output from the color killer circuit 6 in inverse proportion to the level of the envelope signal from the envelope detector 12. The attenuator 15 may also be connected between the band-pass filter 10 and the mixer 16. The mixer 16 is adapted to combine the chrominance signal from the band-pass filter 10 with a luminance signal from a luminance signal processing circuit (not shown), to output the resulting composite video signal.

The construction of the noise removing circuit 17 will hereinafter be mentioned in detail with reference to FIG. 2.

Figure 2:
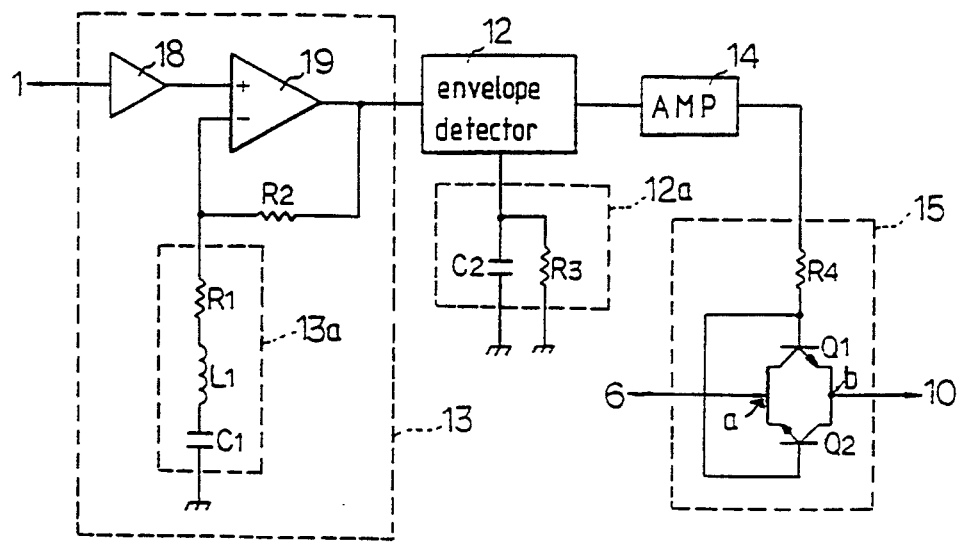
FIG. 2 is a circuit diagram of a noise removing circuit in the system of FIG. 1 in accordance with an embodiment of the present invention.

Referring to FIG. 2, there is shown a circuit diagram of the noise removing circuit 17 in accordance with an embodiment of the present invention. As shown in this figure, the first amplifier 13 includes a buffer 18 for buffering the output from the low-pass filter 1 in the chrominance signal processing circuit 11, an operational amplifier 19 having a non-inverting input terminal (+)

and an inverting input terminal (−) for inputting an output signal from the buffer 18 at its non-inverting input terminal (+), a feedback resistor R2 connected between the inverting input terminal (−) of the operational amplifier 19 and the output terminal of the operational amplifier 19, and a feedback impedance device 13a connected between a ground and a connection point of the resistor R2 and the inverting input terminal (−) of the operational amplifier 19. The feedback impedance device 13a has a resistor R1, a coil L1 and a capacitor Cl, connected in series.

The envelope detector 12 includes a device 12a for determining an integral time constant. The device 12a has resistor R3 and a capacitor C2, connected in parallel as shown in FIG. 2.

The attenuator 15 includes a resistor R4 connected at its one side to the output of the second amplifier 14, and a pair of transistors Q1 and Q2 having their bases connected commonly to the other side of the resistor R4 and their emitters connected to counterpart collectors with respect to each other. The emitter-collector junctions a and b of the transistors Q1 and Q2 are input and output of the attenuator 15, respectively. The emitter-collector junction a is connected to the output of the color killer circuit 6 and the emitter-collector junction b is connected to the input of the band-pass filter 10.

The operation of the chrominance signal playback system with the above-mentioned construction in accordance with the present invention will now be described in detail.

Figure 5:
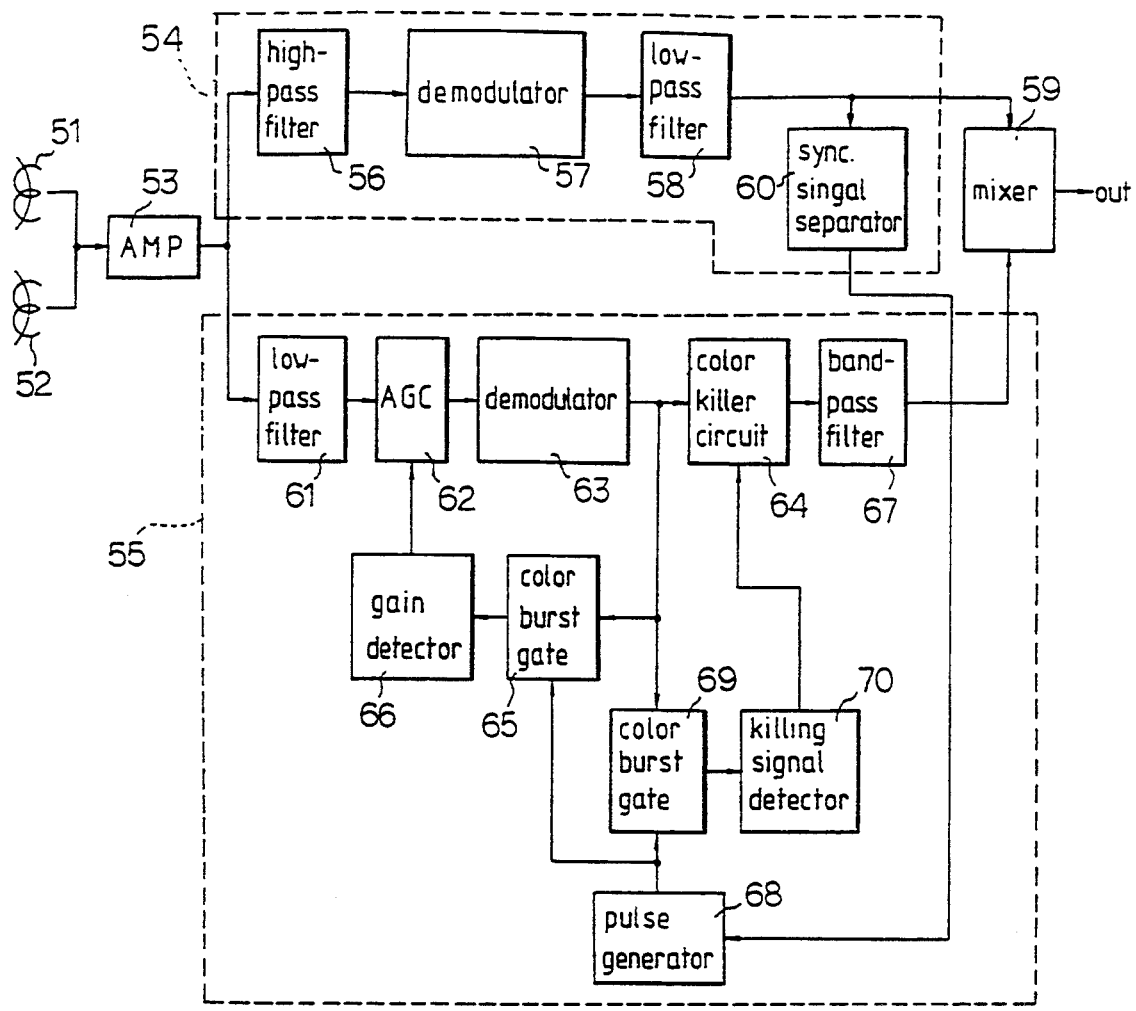
FIG. 5 is a block diagram of a conventional video signal playback system for a video cassette recorder.
Figure 6:
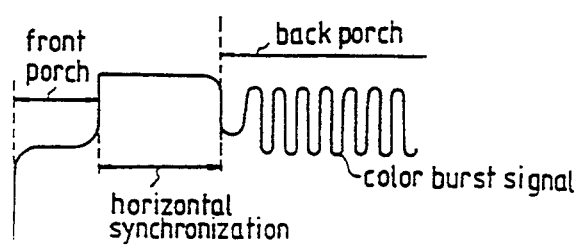
FIG. 6 is a waveform diagram illustrating a color burst signal.

It is noted that the construction of the chrominance signal processing circuit 11 is the same as that of the chrominance signal processing circuit 55 of the prior art, shown in FIG. 5. Thus, the operation of the chrominance signal processing circuit 11 will be omitted and operation of only the noise removing circuit 17 will hereinafter be described in detail.

Figure 3A:
FIGS. 3A to 3G are waveform diagrams of signals from respective components in the system of FIG. 1 according to the present invention.
Figure 3B:
Figure 3C:
Figure 3D:
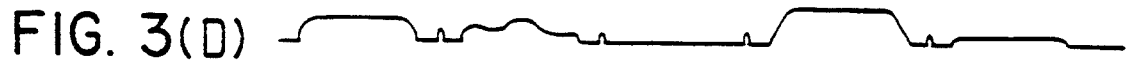

First, a radio frequency of a composite video signal (FIG. 3A) detected by the video head is applied to the low-pass filter 1 which low-pass filters the composite video signal and outputs approximate 629 KHz±500 KHz of chrominance signal as shown in FIG. 3B. This low-pass filtered chrominance signal is applied to the automatic gain controller 2 in the chrominance signal processing circuit 11 and also to the first amplifier 13 in the noise removing circuit 17. The amplified chrominance signal from the first amplifier 13 as shown in FIG. 3C is applied to the envelope detector 12 which detects a peak value of the amplified chrominance signal. The detected peak value is outputted as an envelope signal as shown in FIG. 3D, from the envelope detector 12. From this fact, it can be understood that the envelope signal is in proportion to the level of the amplified chrominance signal.

Figure 3E:
Figure 3F:
Figure 3G:
Figure 4:
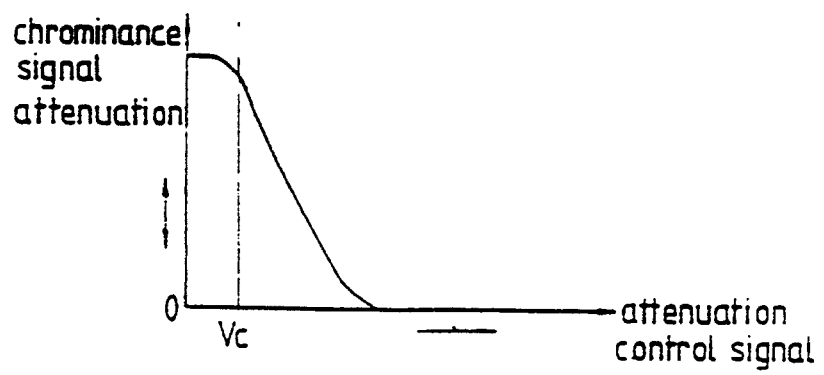
FIG. 4 illustrates a signal attenuation characteristic according to the present invention.

The envelope signal from the envelope detector 12 is amplified by a predetermined amplification degree in the second amplifier 14 which applies the envelope signal, amplified as shown in FIG. 3E, as a chrominance signal attentuation control signal to the attenuator 15. On the other hand, in the chrominance signal processing circuit 11, the demodulated chrominance signal from the demodulator 3 is applied through the color killer circuit 6 to the attenuator 15. In the attenuator 15, the level of the chrominance signal is attenuated depending on the attenuation control signal, or the output voltage from the envelope detector 12, as shown in FIG. 3E. In the attenuation control signal voltage versus chrominance signal attenuation relationship in the attenuator 15, there is evident an attentuation characteristic in which a critical value Vc (noise discrimination reference value) is present and the attenuation control signal voltage and the chrominance signal attentuation are in inverse proportion to each other, as shown in FIG. 4. Assuming that the chrominance signal from the color killer circuit 6 includes noise as shown in FIG. 3F and under this condition the envelope signal through the second amplifier 14 to the attenuator 15 is lower than the critical value Vc due to a weak or low level of chrominance signal, the chrominance signal attenuation as shown in FIG. 36 becomes maximum. This results in a high level of suppression of the chrominance signal and of the accompanying noise to be applied through the attenuator 15 to the band-pass filter 10.

On the other hand, if the envelope signal through the second amplifier 14 to the attenuator 15 is higher than the critical value Vc, the chrominance signal attenuation, as shown in FIG. 36 is reduced gradually. As a result, the attenuation of a desirable level of chrominance signal comes near to zero value. In this manner, a smooth chrominance signal processing can be performed since the chrominance signal attentuation is controlled based on the envelope signal level. This process will hereinafter be described in detail with reference to FIG. 2.

First, in the first amplifier 13, the low-pass filtered chrominance signal from the low-pass filter 1 is buffered by the buffer 18 which applies the buffered chrominance signal to the non-inverting input terminal (+) of the operational amplifier 19. The operational amplifier 19 performs the feedback amplification of a specific frequency band of chrominance signal by means of the feedback resistor R2 and the feedback impedance device 13a. The amplified chrominance signal from the operational amplifier 19 is then applied to the envelope detector 12. In the envelope detector 12, the envelope level of the chrominance signal is detected by the integral time constant determining device 12a. The detected envelope signal from the envelope detector 12 is amplified by the second amplifier 14 which applies the amplified envelope signal as the chrominance signal attentuation control signal to the attenuator 15. In the attenuator 15, the amplified envelope signal is applied through the resistor R4 commonly to the bases of the transistors Q1 and Q2. The chrominance signal from the color killer circuit 6 is also applied at the emitter-collector junction a of the transistors Q1 and Q2. Since the emitters of the transistors Q1 and Q2 are connected to counterpart collectors with respect to each other, the current flowing through the emitter-collector junctions a and b is controlled according to the output signal from the second amplifier 14 which is applied commonly to the bases of the transistors Q1 and Q2. That is, the amount of current flowing through the emitter-collector junctions a and b is in proportion to the attentuation control signal level. As a result, if the attenuation control signal level is increased, the amount of current flowing through the emitter-collector junctions a and b increases, thereby causing the attenuation of the chrominance signal from the color killer circuit 6 to become smaller. On the contrary, when the attenuation control signal level is decreased, the opposite operation is performed.

According to the present invention as described above, a chrominance signal playback system and a method for video cassette recorders are provided for suppressing the noise generated in the system. Thereby, the signal-to-noise ratio and the accompanying image quality can be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A chrominance signal playback system for a video cassette recorder, comprising:
    (A) a chrominance processing circuit including:
    a color killer circuit, and
    (B) a noise removing circuit means for suppressing noise in a chrominance signal processed in the chrominance processing circuit, said noise removing circuit means including:
       (i) an envelope detector for detecting an envelope signal from a chrominance signal filtered from a video signal in the chrominance processing circuit, and
       (ii) an attenuator for attenuating a signal output from said color killer circuit in accordance with a level of the detected envelope signal so as to suppress noise from the processed chrominance signal.

2. A chrominance signal playback system for a video cassette recorder, comprising:
    first filtering means for separating a chrominance signal from a radio frequency of a composite video signal;
    automatic gain control means for automatically controlling the gain of the separated chrominance signal from said first filtering means;
    demodulating means for demodulating the gain-controlled chrominance signal from said automatic gain control means;
    color killer means for blocking or passing the demodulated chrominance signal output from said demodulating means in accordance with the presence and level of a color burst signal in the demodulated chrominance signal output;
    a noise removing circuit connected to the color killer means for detecting an envelope signal from the chrominance signal from said first filtering means and controlling the level of the chrominance signal from said color killer means in accordance with the level of the detected envelope signal to remove noise from the chrominance signal from said color killer means; and
    second filtering means for filtering the noise-removed chrominance signal from said noise removing circuit to pass a desired frequency band of chrominance signal.

3. A chrominance signal playback system for a video cassette recorder, as set forth in claim 2, wherein said noise removing circuit includes:
    a first amplifier connected to the output of the first filter means and which amplifies the chrominance signal from said first filtering means by a predetermined amplification-degree;
    an envelope detector which receives the amplified chrominance signal from said first amplifier and which detects the envelope signal from the amplified chrominance signal;
    a second amplifier which amplifies the envelope signal from said envelope detector by a predetermined amplification degree; and
    an attenuator which attenuates the level of the chrominance signal from said color killer means in response to the amplified envelope signal from said second amplifier.

4. A chrominance signal playback system for a video cassette recorder, as set forth in claim 3, wherein said first amplifier includes:
    a buffer for buffering the chrominance signal inputted therein;
    an operational amplifier for inputting an output signal from said buffer at its non-inverting input terminal;
    a feedback resistor connected between the inverting input terminal of said operational amplifier and the output terminal of said operational amplifier; and
    a feedback impedance device connected between ground and a connection point of said feedback resistor and the inverting input terminal of said operational amplifier.

5. A chrominance signal playback system for a video cassette recorder, as set forth in claim 4, wherein said feedback impedance device has a resistor, a coil and a capacitor.

6. A chrominance signal playback system for a video cassette recorder, as set forth in claim 5, wherein said resistor, coil and capacitor, in order are connected in series.

7. A chrominance signal playback system for a video cassette recorder, as set forth in claim 3, wherein said envelope detector includes a device for determining an integral time constant.

8. A chrominance signal playback system for a video cassette recorder, as set forth in claim 7, wherein said integral time constant determining device has a resistor and a capacitor.

9. A chrominance signal playback system for a video cassette recorder, as set forth in claim 8, wherein said resistor and capacitor are connected in parallel.

10. A chrominance signal playback system for a video cassette recorder, as set forth in claim 3, wherein said attenuator includes:
    a resistor connected at its one side to the output of said second amplifier; and
    first and second transistors having their bases connected commonly to the other side of said resistor and their emitters connected to counterpart collectors with respect to each other, the emitter-collector junctions of said first and second transistors being input and output of said attenuator, respectively.

11. A chrominance signal playback system for a video cassette recorder, as set forth in claim 3, wherein said attenuator attenuates the level of the chrominance signal from said color killer means in inverse proportion to the level of the envelope signal inputted as the control signal thereto.

12. A chrominance signal playback system for a video cassette recorder, as set forth in claim 11, wherein said attenuator has a reference value with respect to the envelope signal inputted as the control signal thereto, said attenuator making the chrominance signal attenuation smaller if the envelope signal level is higher than the reference value and larger if the envelope signal level is lower than the reference value.

13. A chrominance signal playback system for a video cassette recorder, as set forth in claim 2, wherein said first filtering means is a low-pass filter.

14. A chrominance signal playback system for a video cassette recorder, as set forth in claim 2, wherein said second filtering means is a band-pass filter.

15. A chrominance signal playback system for a video cassette recorder, as set forth in claim 3, wherein said attenuator is coupled to the output of said second filtering means.

16. A chrominance signal playback system for a video cassette recorder, as set forth in claim 2, wherein said color killer means has a reference value with respect to the burst signal, said color color killer means passing the chrominance signal if the color burst signal level is higher than the reference value and blocking the chrominance signal if no color burst signal is present or if the color burst signal level is lower than the reference value.

17. A chrominance signal playback method for a video cassette recorder, comprising the steps of:
 (a) separating a low frequency of chrominance signal from a radio frequency of composite video signal detected by a video head;
 (b) automatically controlling the gain of the separated chrominance signal, detecting an envelope signal from the separated chrominance signal and demodulating the gain-controlled chrominance signal;
 (c) blocking or passing the demodulated chrominance signal in accordance with the presence and level of a color burst signal in the demodulated chrominance signal; and
 (d) attenuating a level of the passed chrominance signal in accordance with a level of the detected envelope signal.

18. A chrominance signal playback method for a video cassette recorder as set forth in claim 17, wherein said step (c) includes the step of passing the chrominance signal if the color burst signal level is higher than a given reference value and blocking the chrominance signal if no color burst signal is present or if the color burst signal level is lower than the reference value.

19. A chrominance signal playback method for a video cassette recorder as set forth in claim 17, wherein said step (d) includes the step of attenuating the level of the passed chrominance signal in inverse proportion to the level of the detected envelope signal.

20. A chrominance signal playback method for a video cassette recorder as set forth in claim 19, wherein the chrominance signal attenuation becomes smaller if the envelope signal level is higher than a given reference value and larger if the envelope signal level is lowered below the reference value.

* * * * *